Oct. 11, 1949.  R. CHILTON  2,484,073
DYNAMIC DAMPER

Filed May 3, 1945  2 Sheets-Sheet 1

INVENTOR.
ROLAND CHILTON.
BY
ATTORNEY

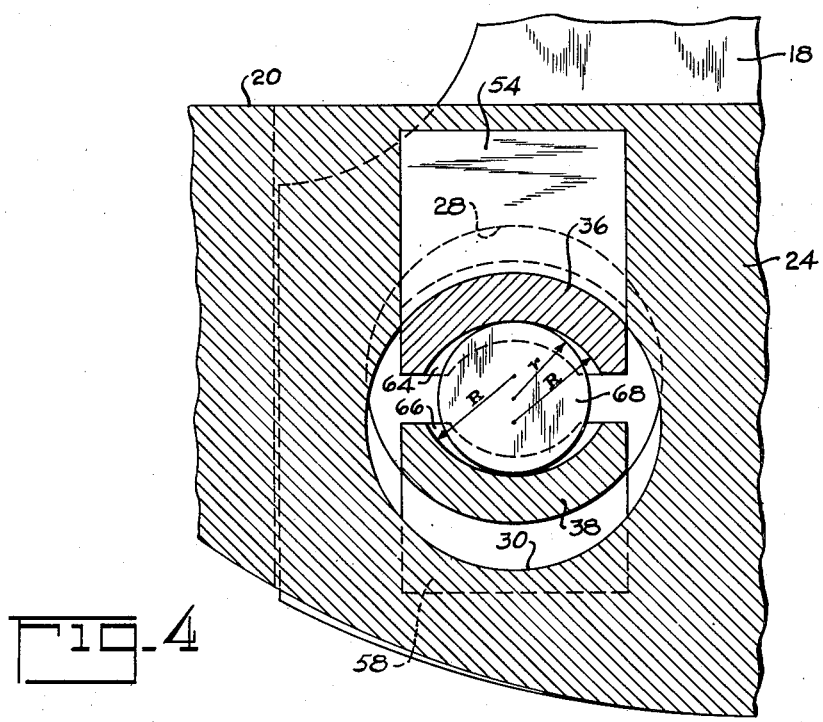
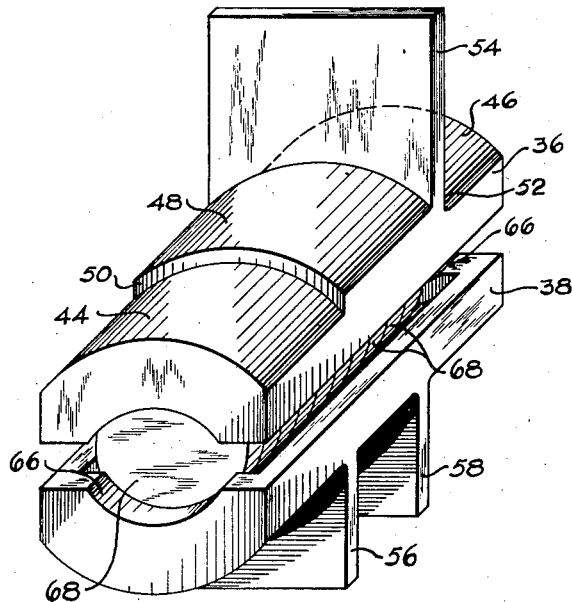

Patented Oct. 11, 1949

2,484,073

UNITED STATES PATENT OFFICE 2,484,073

DYNAMIC DAMPER

Roland Chilton, Ridgewood, N. J., assignor to Wright Aeronautical Corporation, a corporation of New York Application May 3, 1945, Serial No. 591,782

17 Claims. (Cl. 74—604)

This invention relates to centrifugal pendulums for damping vibrations and is particularly directed to improvements in vibration damping means of the type illustrated in my prior Patent No. 2,112,984.

Said prior patent discloses a device for damping torsional vibrations of a crankshaft. This damping device is now commonly known as a "dynamic damper" and is now in general use on aircraft engines. As disclosed in this prior patent, a crankshaft counterweight is mounted on a lateral crankshaft extension for pendular movement with respect thereto. The counterweight support comprises a pair of spaced rollers disposed in holes having a diameter larger than that of said rollers and formed in both said crankshaft extension and said counterweight, whereby said holes provide cylindrical tracks for the rollers for supporting the counterweight against the centrifugal forces acting thereon during crankshaft rotation. With this construction, the counterweight has a pendular bi-filar support and comprises a centrifugal pendulum with the properties of a simple pendulum having a length equal to the difference in diameter between said rollers and holes.

With this prior art construction, the counterweight is designed to neutralize torsional vibrations of the engine crankshaft. It has been found that engine crankshafts may also be subject to bending vibrations which tend to cause vibrations of the counterweight in a direction parallel to the axis of the crankshaft. Such vibrations are sometimes referred to as "counterweight flap" since they deflect the counterweight from its normal plane of rotation. Should these crankshaft bending vibrations become synchronous with the natural vibration frequency of the counterweight in this axial direction, failure of the crankshaft, particularly of the counterweight supporting structure, may occur. Also, since the counterweight and crankshaft extension are provided with some axial clearance, axial vibrations of the counterweight will cause sliding of the counterweight rollers relative to their tracks, thereby causing wear and scuffing of the rollers and/or their tracks. Accordingly, the prime object of this invention is to provide a "dynamic damper" having novel means for preventing such roller and track scuffing and such crankshaft failures.

At this point it should be noted that the phrase "parti-cylindrical surface" or "parti-cylindrical track," as hereinafter used in the specification and claims, refers to the segment of the surface of a cylinder cut off by a plane passing through said cylinder substantially parallel to its axis.

It is known that, if the large mass of the counterweight is supported with axial freedom so as not to partake of the axial vibrations of the shaft, then the natural frequency of the system will be greatly increased, thereby in many cases, raising this objectionable natural or resonant frequency beyond the frequency range of the crankshaft flap vibrations occurring within the operating speed range of the engine. Also, it is known that if the suspension of the counterweight should give it a natural frequency in the axial direction tuned to the order (frequency per revolution) of the axial crankshaft vibration, this vibration will be neutralized—e. g. attention is directed to my prior Patents No. 2,116,861 and 2,121,950. The present invention provides a simple structure which will achieve these results while affording a frictionless counterweight suspension of high capacity as needed to give durability under the high centrifugal loads involved.

To this end, inner and outer roller track members are fitted rigidly to the counterweight and the crankshaft respectively. One of these members faces the other and each track member preferably sub-tends substantially the entire axial width of the counterweight assembly. The tracks comprise parti-cylindrical surfaces facing each other and adapted to receive therebetween roller means of the appropriate smaller diameter. It will be seen that in this structure the length of the rolling contact available on each track member is virtually the entire width of the crankshaft-counterweight assembly, being much more than in the structures of my prior Patents No. 2,116,861 and 2,121,950. In fact, a conventional roller as illustrated in my prior Patent No. 2,112,984 would have greater capacity in this new structure. To provide for axial vibration of the counterweight, that is, vibration normal to its plane of rotation, the rollers herein are sub-divided to comprise a number of discs (10 in the example of the drawing) and the peripheries of these discs are each formed with a crowned profile which permits them to rock axially as well as to roll in the plane of rotation. It will be seen that if the crowned profile radius of each roller element or disc be made greater than one half the roller diameter, then the counterweight will be in axial stable equilibrium relative to the crankshaft, under the centrifugal force acting on the counterweight, and the natural axial frequency of the counterweight can be varied by varying the dimension of the crown radius so that by suitable selection of this radius, the counterweight may be tuned to a given order of axial vibration. In any event, this counterweight suspension gives the counterweight axial freedom whereby the natural "flap" or axial frequency of the crankshaft system may be increased. It will be seen that the action of the individual roller discs under relative axial motion is a rolling contact with the track members, as distinct from the sliding action which would occur with conventional rollers as my Patent No. 2,112,984. This rolling action prevents the scuffing which has been experienced on occasion in the previous structure.

It will also be seen that each of the multiple roller discs in the present invention is loaded only in compression in contra-distinction to the bending stresses engendered in the roller in the conventional structure just cited. This further increases the centrifugal load capacity of the counterweight suspension system of the present invention.

Other objects of this invention will become apparent upon reading the annexed detailed description in connection with the drawing in which:

Figure 4 is a sectional view taken along line 4—4 of Figure 3; and

Figure 5 is a perspective view of the composite roller and track assembly.

Figures 1, 2, 3:
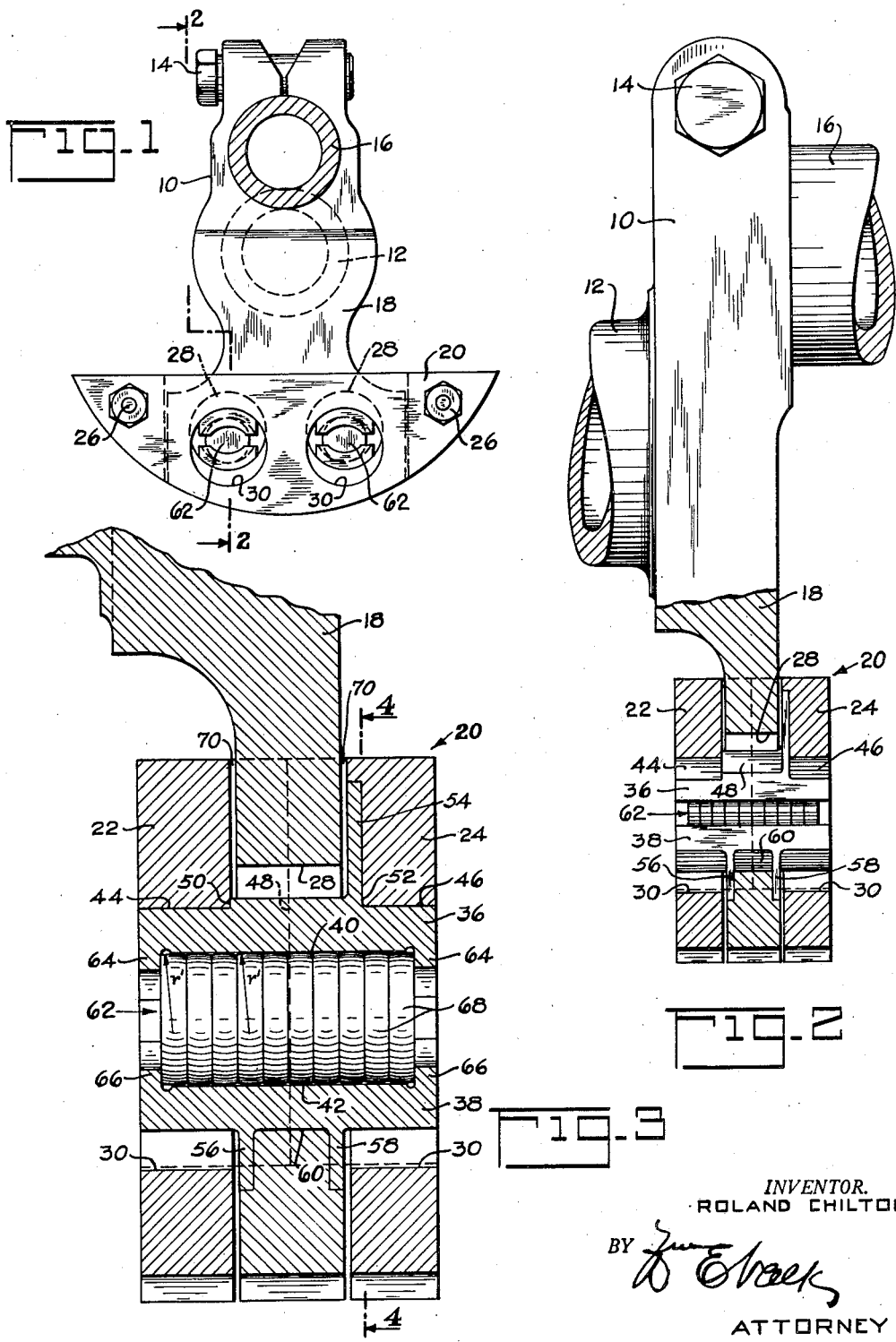
Figure 1 is an end view of a crankshaft counterweight supported in accordance with the present invention.
Figure 2 is an enlarged view partly in section taken along line 2—2 of Figure 1.
Figure 3 is a further enlargement of a portion of Figure 2.

Referring to the drawing, a crankcheek 10 having a crankshaft journal 12 may be clamped by a bolt 14 to a crankshaft crankpin 16. This is a conventional crankshaft construction for a radial cylinder aircraft engine. The crankcheek 10 is provided with an extension 18 on the opposite side of the crankshaft axis from the crankpin 16. A counterweight 20 adapted to be disposed about the extension 18 and supported therefrom comprises a pair of side plates 22 and 24 secured together by bolts 26 or other suitable securing means. The extension 18 is provided with a pair of spaced parallel bores 28 having their axes parallel to the crankshaft axis and each counterweight side plate is provided with a similarly-spaced pair of parallel bores 30, also having their axes parallel to the crankshaft axis. The arrangement is such that a roller assembly is adapted to be disposed within each set of bores 28 and 30 to provide a pendular bi-filar support for the counterweight 20 from the crankshaft extension 18.

Each said roller assembly comprises a pair of hardened steel members 36 and 38 respectively having parti-cylindrical tracks 40 and 42 of equal radius R and adapted to be supported with their parti-cylindrical tracks facing each other. The member 36 is provided with outer parti-cylindrical end surfaces 44 and 46 to be received and seated within the bores 30 within the counterweight plates 22 and 24 respectively. The member 36 also has a raised intermediate outer surface 48 providing shoulders 50 and 52 against which the counterweight plates 22 and 24 are adapted to be clamped when they are secured together by the bolts 26. In addition, at the shoulder 52, the member 36 is provided with a laterally-extending flange 54 which is adapted to be received within a correspondingly-shaped channel in the counterweight plate 24. In this way, the member 36 is secured against axial and rotative movement relative to the counterweight 20. The hardened steel member 38 is provided with a pair of spaced flanges 56 and 58 adapted to be received within correspondingly-shaped channels in the sides of the crankshaft extension 18. Each of said members 38 is also provided with an intermediate parti-cylindrical surface 60 seated within its associated bore 28 of the crankshaft extension 18. In this way, the member 38 is secured against axial and rotatable movement relative to the crankshaft extension 18.

The roller means 62 are disposed between each pair of members 36 and 38 for rolling engagement with their parti-cylindrical tracks 40 and 42. The members 36 and 38 are respectively provided with end flanges 64 and 66 to retain the roller means in place between the tracks 40 and 42. During crankshaft rotation, the centrifugal force acting on the counterweight 20 urges the counterweight outwardly into contact with the surfaces 44 and 46 on each member 36, thereby maintaining engagement between the roller means 62 and their tracks 40 and 42 and maintaining each track member 38 in engagement with its associated bore 28 in the crankshaft extension 18.

Each roller means 62 has a radius $r$ smaller than the radius $R$ of the tracks 40 and 42 as illustrated in Figure 4, whereby the two roller means 62 provide a pendular bi-filar support for the counterweight 20 having a simple pendulum length equal to the difference between the diameter of the roller means 62 and the diameter of the tracks 40 and 42. Because the diameter of the roller means 62 is less than that of the tracks 40 and 42, the members 38 extend through the bores 30 in clearance relation to the counterweight plates 22 and 24 and the members 36 extend through the bores 30 in the crankshaft extension 18 in clearance relation thereto.

With this construction, the members 36 and 38 provide roller tracks 40 and 42 which sub-tend substantially the entire width of the counterweight structure. In this way, the members 36 and 38 provide a roller track contact area which is greater than the conventional structure such as illustrated in my prior Patent No. 2,112,984. This feature is quite important, particularly in modern aircraft engines because of the large centrifugal forces involved. Also, in said prior patent, the rollers are subject to bending stresses since there the counterweight plates provide parti-cylindrical tracks engaging only the outer ends of the rollers while the crankshaft extension provides parti-cylindrical tracks engaging only intermediate portions of the rollers. However, with the present construction, the roller means 62 are subject only to compression stresses since both the counterweight and the crankshaft extension are provided with tracks 40 and 42 both of which engage the entire length of the roller means 62.

In order to assemble the counterweight and roller structure on the crankshaft, the track members 38 are first inserted and mounted in the bores 28 on the crankshaft extension 18; the flanges 56 and 58 being short enough in length to permit this. Then, the roller means 62 and the other track members 36 are disposed in place and the counterweight plates 22 and 24 are secured thereabout, as illustrated, by bolts 26.

At this point, it should be noted that the invention obviously is not limited to the aforedescribed specific construction of the track members 36 and 38. Thus, these members may be differently constructed and still provide two pairs of facing parti-cylindrical tracks for the rollers sub-tending substantially the entire width of the counterweight assembly with one track member of each pair carried by the crankshaft extension in clearance relation with the counterweight, and with the other track member of each pair carried by the counterweight in clearance relation with the crankshaft extension.

As illustrated, each roller means 62 comprises a plurality of roller discs 68 and each roller disc preferably is provided with a crowned profile to facilitate axial vibration of the counterweight 20. To this end, a clearance 70 is provided between crankshaft extension 18 and the counterweight plates 22 and 24 and a small clearance (not shown) is necessary between the total length of all the roller discs 68 and the distance between the flanges 64 or flanges 66. For reasons of clarity, the clearance 70 has been greatly exaggerated on the drawing. With this construction, the roller discs 68 can roll in the tracks 40 and 42 in the plane of rotation of the counterweight 20 and in addition, the roller discs can rock axially relative to this plane of rotation. Accordingly, axial vibration of the counterweight 20 results in axial rocking movement of the roller discs instead of the sliding movement of the rollers of the conventional prior art construction, thereby eliminating the aforementioned scuffing and wear of the rollers and/or roller tracks. In addition, by giving the counterweight some axial freedom relative to the crankshaft, the natural frequency of bending vibrations of the crankshaft system will be increased and, in some cases, this increase will raise the natural bending frequency beyond the frequency of the crankshaft bending vibrations encountered within the operating speed range of the crankshaft, thereby avoiding resonance.

As illustrated, the crowned profile of the roller discs is circular with a radius $r'$ larger than the radius $r$ of each roller disc. In this way, any rocking of the roller discs from their positions parallel to the plane of rotation of the counterweight 20 will move the counterweight inwardly against the centrifugal forces acting on the counterweight, thereby providing the counterweight with a stable central position from which the counterweight can swing axially as a pendulum. By suitable selection of the magnitude of the crowned circular radius $r'$, the counterweight can be provided with any desired natural frequency of vibration in an axial direction. Accordingly, by selection of the radius $r'$, the counterweight may be tuned to dampen crankshaft bending vibrations of a particular frequency per crankshaft revolution.

At this point, it should be noted that the roller "profile," as used in the specification and claims, is intended to designate the contour of the contact surface of the roller as viewed edgewise.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination, a shaft member, a counterweight member, said members having similar but facing parti-cylindrical tracks parallel to the axis of said shaft member, and a plurality of disc-like rollers disposed between said tracks, each of said rollers having a radius smaller than that of said tracks.

2. In combination, a shaft member, a counterweight member, said members having similar but facing parti-cylindrical tracks parallel to the axis of said shaft member, and a plurality of disc-like rollers disposed between said tracks, each of said rollers having a radius smaller than that of said tracks and having a crowned profile.

3. In combination, a shaft member, a counterweight member, said members having similar but facing parti-cylindrical tracks parallel to the axis of said shaft member, and a plurality of disc-like rollers disposed between said tracks, each of said rollers having a radius smaller than that of said tracks and having a crowned circular profile of larger radius than the roller radius about the roller axis.

4. In combination, a shaft, a member carried by and extending laterally from said shaft, a counterweight member disposed adjacent said extending member, each of said members being provided with similar but facing arcuate tracks, said tracks each sub-tending substantially the combined width of said members, and a plurality of side-by-side disc-like rollers disposed between said tracks and rollable thereon, said disc-like rollers each having a crowned profile.

5. In combination, a shaft, a member carried by and extending laterally from said shaft, a counterweight member disposed adjacent said extending member, a pair of elements each carried by a different one of said members and projecting into an opening in the other of said members in clearance relation thereto, said elements having similar but facing parti-cylindrical tracks and roller means disposed between said tracks having a radius smaller than that of said tracks, said roller means comprising a plurality of disc-like rollers each having a crowned profile.

6. In combination, a shaft member, a counterweight member disposed adjacent said shaft member, a pair of elements each carried by a different one of said members in clearance relation with the other of said members, said elements each sub-tending substantially the combined width of said members and each having a parti-cylindrical track similar to and facing the track on the other of said elements, and roller means disposed between said tracks having a radius smaller than that of said tracks.

7. In combination, a shaft, a member carried by and extending laterally from said shaft, a counterweight member disposed adjacent said extending member, a pair of elements each carried by a different one of said members in clearance relation with the other of said members, said elements each sub-tending substantially the combined width of said members and each having a parti-cylindrical track similar to and facing the track on the other of said elements, and roller means disposed between said tracks having a radius smaller than that of said tracks, said roller means comprising a plurality of side-by-side disc-like rollers each having a crowned profile.

8. In combination, a shaft member, a counterweight member disposed adjacent said shaft member, a pair of elements each carried by a different one of said members in clearance relation with the other of said members, said elements each sub-tending substantially the combined width of said members and each having a parti-cylindrical track similar to but facing the track on the other of said elements, and roller means disposed between said tracks having a radius smaller than that of said tracks, said roller means comprising a plurality of side-by-side disc-like rollers each having a circular crowned profile of larger radius than that of said rollers.

9. In combination, a shaft member, a counterweight member, means providing a pendular bifilar suspension of said counterweight member from said shaft member, said means comprising two pairs of facing arcuate tracks disposed parallel to the axis of said shaft member, one track of each pair being carried by one of said members and the other track of said pair being carried by the other of said members, and a plurality of substantially parallel side-by-side disc-like rollers disposed between each pair of said tracks for rolling action thereon.

10. In combination, a shaft member, a counterweight member disposed adjacent said shaft member, and a pair of means providing a pendular bi-filar suspension of said counterweight member from said shaft member, each of said means comprising a pair of elements each carried by a different one of said members and projecting at least partly across the other of said members in clearance relation thereto, said elements each having a parti-cylindrical track similar to but facing the track on the other of said elements, and roller means disposed between said tracks having a radius smaller than that of said tracks.

11. In combination, a shaft member, a counterweight member, and a pair of means providing a pendular bi-filar suspension of said counterweight member from said shaft member, each of said means comprising a pair of elements each carried by a different one of said members, said elements each having a parti-cylindrical surface disposed parallel to the axis of said shaft member and facing the corresponding surface on the other of said elements, and a plurality of side-by-side disc-like rollers disposed between said two cylindrical surfaces, each of said rollers having a radius smaller than that of said surfaces and each having a crowned profile.

12. In combination, a shaft member, a counterweight member, and a pair of means providing a pendular bi-filar suspension of said counterweight member from said shaft member, each of said means comprising a pair of elements each carried by a different one of said members, said elements each having a parti-cylindrical surface disposed parallel to the axis of said shaft member and facing the corresponding surface on the other of said elements, and a plurality of side-by-side disc-like rollers disposed between said surfaces, each of said rollers having a radius smaller than that of said surfaces, each of said rollers also having a circular crowned profile of a radius larger than the roller radius about the roller axis.

13. In combination, a shaft member, a counterweight member, each of said members having an arcuate track facing an arcuate track on the other of said members and disposed parallel to the axis of said shaft member, and a plurality of side-by-side disc-like rollers disposed between said two tracks for rolling action thereon.

14. In combination, a shaft member, a counterweight member, each of said members having an arcuate track facing an arcuate track on the other of said members and disposed parallel to the axis of said shaft member, and a plurality of side-by-side disc-like rollers disposed between said two tracks for rolling action thereon, each of said rollers having a crowned profile.

15. In combination, a shaft member and a weight member, the one embracing the other, elements rigid with respective members and having arcuate tracks disposed parallel to the axis of said shaft member, and a composite roller engaged between said tracks for rolling action thereon and comprising a plurality of substantially adjacent discs having crowned profiles.

16. In combination, a shaft member and a weight member, elements rigid with respective members, each of said elements having a parti-cylindrical track facing the track of the other of said elements, said tracks being disposed parallel to the axis of said shaft member, and a plurality of supporting discs engaged between said two tracks for rolling action thereon both circumferentially and axially of said shaft member.

17. In combination, a plurality of discs comprising a composite cylinder, each of said discs having a crowned profile, a pair of members each having an arcuate track engaging the sides of said discs opposite to that engaged by the other track, and a shaft and a weight to which said members are respectively secured with said tracks disposed parallel to the axis of said shaft whereby said weight may vibrate both axially and circumferentially of the shaft under rolling action between said crowned profile and said arcuate tracks.

ROLAND CHILTON.

REFERENCES CITED

The following references are of record in the file of this patent:

UNITED STATES PATENTS

| Number | Name | Date |
|---|---|---|
| 2,116,861 | Chilton | May 10, 1938 |
| 2,213,417 | Stumpp | Sept. 3, 1940 |